(No Model.)

W. A. PATRICK.
SHAFT BEARING.

No. 318,649. Patented May 26, 1885.

WITNESSES.
C. Sedgwick
Chas. Lurcott

INVENTOR.
W. A. Patrick
By Munn & Co
Attorneys

UNITED STATES PATENT OFFICE.

WILLIAM A. PATRICK, OF RUTLAND, VERMONT.

SHAFT-BEARING.

SPECIFICATION forming part of Letters Patent No. 318,649, dated May 26, 1885.

Application filed April 7, 1885. (No model.)

*To all whom it may concern:*

Be it known that I, WILLIAM A. PATRICK, of Rutland, in the county of Rutland and State of Vermont, have invented certain new and useful Improvements in Shafting-Bearings, of which the following is a full, clear, and exact description.

This invention relates to the bearings of shafts applicable to machines of different kinds, in which the shaft is used to convert a rotary motion into a reciprocating one, or vice versa—that is, has a rotary motion communicated to it from a reciprocating one, or in which the shaft has simply a reciprocating motion.

The invention consists in a combination, with a rotary or reciprocating shaft and the bearing-box therefor, of a journal-sleeve secured on said shaft of greater diameter than the shaft for fitting within said bearing-box, whereby a large bearing-surface is obtained for the shaft without a corresponding increase in the weight, diameter, or cost of the shaft, and other advantages are secured, substantially as hereinafter specified; and the invention furthermore consists in a combination, with a crank-shaft, of said enlarged detached sleeve and the bearing-box in which it works.

Reference is to be had to the accompanying drawings, forming a part of this specification, in which similar letters of reference indicate corresponding parts in all the figures.

Figures 1, 2:
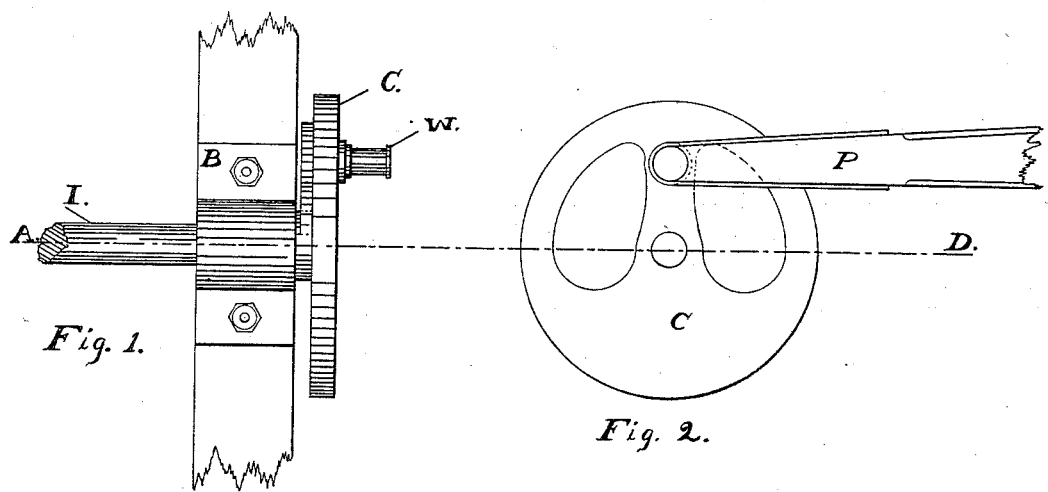
Figures 3, 4, 5:
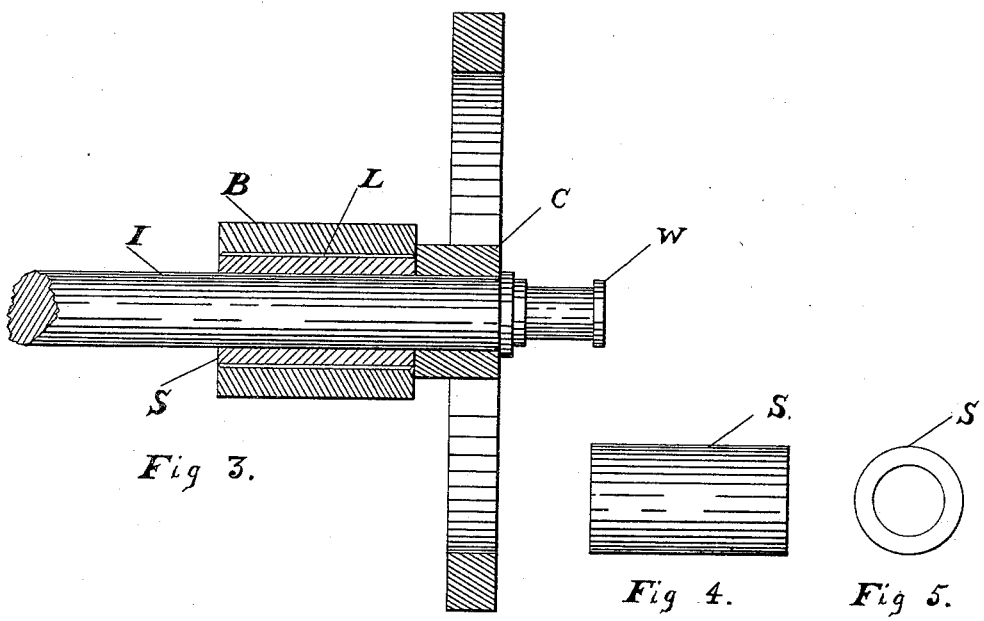

Figure 1 is a longitudinal view of a crank-shaft in part with attached crank wheel or disk, bearing-box, and timber supporting the whole, with my invention applied. Fig. 2 is an end view or elevation of the same. Fig. 3 is a longitudinal partly-sectional view, upon a larger scale, on the line A D in Figs. 1 and 2. Fig. 4 is a longitudinal view of the journal-sleeve detached, and Fig. 5 an end view of the same.

I indicates the shaft, to which motion is given, or from which motion may be taken, said shaft being represented as having a crank or projection on its one end carrying an overhanging crank wheel or disk, C, provided with a wrist-pin, W, to which is attached a pitman or connecting rod, P, for communicating rotary or reciprocating motion to the shaft I from or by the reciprocating motion of the pitman, or for communicating a reciprocating motion to the pitman from the rotary or reciprocating motion of the shaft.

B is the journal or bearing box of the shaft, which may be constructed to leave a space, L, to receive any suitable lining metal.

S is a journal-sleeve secured to the shaft and arranged to work in the bearing-box B. This sleeve is of larger diameter than the shaft, and the box B is made to correspond. By means of this sleeve a large bearing-surface is obtained for the shaft without a corresponding increase in the weight, diameter, or cost of the shaft, and when used in connection with a rotary or reciprocating motion, as described, increased steadiness and durability will be secured to the bearing or working parts, as also increased strength.

The sleeve S may be made of steel, cast or chilled iron, phosphor-bronze, or any other suitable metal or alloy, and may be keyed on, shrunk on, or fastened with pins or screws, or be otherwise suitably secured. Said sleeve S, being fastened to the shaft and revolving or reciprocating with it, gives a larger bearing-surface to withstand the shocks transmitted to it through the pulling and thrusting action of the pitman, thus greatly increasing the wearing qualities of the shaft and giving a smooth and easy-running bearing. By making the sleeve S detachable from the shaft it may be removed when badly worn or grooved and be replaced by another sleeve, thus making the bearing practicably indestructible and prolonging the durability of the shaft. It is proposed to make the sleeve S a hardened one, to give greater efficiency and durability.

Having thus described my invention, I claim as new and desire to secure by Letters Patent—

1. The combination, with a rotary or reciprocating shaft, of an attached journal-sleeve, S, of larger diameter than the shaft, and the bearing-box B, made to receive said sleeve within it, substantially as and for the purpose or purposes herein described.

2. In a crank or other shaft, the combination of the detachable hardened sleeve S, secured to said shaft and of larger diameter than it, and the bearing-box B, essentially as shown and described, and for the purposes specified.

3. The combination of the shaft I of the crank-wheel C, having a wrist-pin W, the pitman P, the enlarged journal-sleeve S, secured to said shaft, and the bearing-box B, substantially as specified.

WILLIAM A. PATRICK.

Witnesses:
E. O. PRATT,
E. A. ROCK.